United States Patent
Saga

(10) Patent No.: US 10,027,852 B2
(45) Date of Patent: Jul. 17, 2018

(54) IMAGE PROCESSING DEVICE, IMAGE FORMING APPARATUS, AND IMAGE PROCESSING METHOD

(71) Applicant: Yoshitaka Saga, Kanagawa (JP)

(72) Inventor: Yoshitaka Saga, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 8 days.

(21) Appl. No.: 15/289,256

(22) Filed: Oct. 10, 2016

(65) Prior Publication Data
US 2017/0118379 A1 Apr. 27, 2017

(30) Foreign Application Priority Data
Oct. 23, 2015 (JP) ................................. 2015-208641

(51) Int. Cl.
*H04N 1/60* (2006.01)
*H04N 1/50* (2006.01)
*H04N 1/00* (2006.01)

(52) U.S. Cl.
CPC ....... *H04N 1/6008* (2013.01); *H04N 1/00023* (2013.01); *H04N 1/00068* (2013.01); *H04N 1/00082* (2013.01); *H04N 1/00933* (2013.01); *H04N 1/504* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 4,701,805 A | * | 10/1987 | Maeshima | H04N 1/193 358/3.06 |
| 4,835,618 A | * | 5/1989 | Shimizu | H04N 1/32358 358/401 |
| 4,873,570 A | * | 10/1989 | Suzuki | G06F 3/033 358/515 |
| 4,987,484 A | * | 1/1991 | Ikeda | H04N 1/407 358/534 |
| 4,996,591 A | * | 2/1991 | Kadowaki | H04N 1/62 358/519 |
| 5,001,574 A | * | 3/1991 | Shimizu | H04N 1/00681 358/448 |

(Continued)

FOREIGN PATENT DOCUMENTS

JP 2009-172999 8/2009

*Primary Examiner* — Madelein Nguyen
(74) *Attorney, Agent, or Firm* — Cooper & Dunham LLP

(57) ABSTRACT

An image processing device includes a first control circuit to transfer image data of a plurality of color components on a line basis in a main scanning direction, and a second control circuit connected to the first control circuit to process the image data of each one of the plurality of color components transferred from the first control circuit and output the processed image data on a line basis on an object. The first control circuit includes a plurality of registers provided for each one of the plurality of color components, a calculation circuit connected to the plurality of registers, a plurality of addition circuits provided for each one of the plurality of color components and connected to a corresponding one of the plurality of registers and the calculation circuit, and a transfer control circuit connected to the calculation circuit and the plurality of addition circuits.

20 Claims, 6 Drawing Sheets

(56) References Cited

U.S. PATENT DOCUMENTS

| | | | | |
|---|---|---|---|---|
| 5,121,230 A * | 6/1992 | Honma | ............... | H04N 1/4076 358/494 |
| 5,140,413 A * | 8/1992 | Suzuki | ................... | H04N 1/401 358/500 |
| 5,153,929 A * | 10/1992 | Itagaki | ................... | H04N 1/401 348/255 |
| 5,646,745 A * | 7/1997 | Kajitani | ................... | G06T 1/20 358/443 |
| 5,923,825 A * | 7/1999 | Orlicki | ................... | H04N 1/502 358/1.1 |
| 6,539,120 B1 * | 3/2003 | Sita | ........................... | G06T 1/60 348/E5.108 |
| 2001/0050678 A1 * | 12/2001 | Nishikubo | ........... | G09G 3/3677 345/204 |
| 2003/0011609 A1 * | 1/2003 | Deering | .................... | G06F 3/14 345/582 |
| 2003/0095272 A1 * | 5/2003 | Nomizu | ............. | H04N 1/32561 358/1.9 |
| 2004/0085462 A1 * | 5/2004 | Sasaki | ....................... | G06T 1/20 348/231.6 |
| 2004/0150747 A1 * | 8/2004 | Sita | .......................... | G06T 1/60 348/558 |
| 2005/0206969 A1 * | 9/2005 | Murade | ................ | G09G 3/3688 358/474 |
| 2005/0280623 A1 * | 12/2005 | Tani | ...................... | G09G 3/3611 345/98 |
| 2006/0277437 A1 * | 12/2006 | Ohtsuka | ................ | G06F 9/3879 714/33 |
| 2009/0009643 A1 * | 1/2009 | Muroshima | .......... | H04N 5/3532 348/308 |
| 2009/0168097 A1 | 7/2009 | Tsuchida | | |
| 2009/0323137 A1 * | 12/2009 | Kimura | ................ | H04N 1/0402 358/474 |
| 2013/0112852 A1 * | 5/2013 | Kizuna | .................. | H04N 5/378 250/208.1 |
| 2015/0355762 A1 * | 12/2015 | Tripathi | ................... | G06T 1/20 345/173 |
| 2015/0365554 A1 * | 12/2015 | Kawana | ............. | H04N 1/02885 358/474 |
| 2016/0062927 A1 | 3/2016 | Saga | | |
| 2016/0077459 A1 * | 3/2016 | Miyadera | ............. | G03G 15/043 347/118 |

\* cited by examiner

IMAGE PROCESSING DEVICE, IMAGE FORMING APPARATUS, AND IMAGE PROCESSING METHOD

CROSS-REFERENCE TO RELATED APPLICATION

This patent application is based on and claims priority pursuant to 35 U.S.C. § 119(a) to Japanese Patent Application No. 2015-208641, filed on Oct. 23, 2015, in the Japan Patent Office, the entire disclosure of which is hereby incorporated by reference herein.

BACKGROUND

Technical Field

Embodiments of the present invention relate to an image processing device, an image forming apparatus, and an image processing method.

Related Art

An image forming apparatus, such as a color printer and a color copier, includes a first control circuit to control the entire operation of the image forming apparatus and a second control circuit to control the operation of an output device to output image data on a sheet of paper. The output device outputs the image data on the sheet of paper on a line basis in a main scanning direction. The first control circuit divides input image data to a plurality of lines and then transfers the image data to the second control circuit by the unit of one or more lines in synchronization with a conveying speed of the sheet. Subsequently, the second circuit processes the image data transferred from the first control circuit to output the processed data on a target object on a line basis. The first control circuit and the second control circuit constitute an image processing device of the image forming apparatus.

SUMMARY

An image processing device, according to one embodiment, includes a first control circuit to transfer image data of a plurality of color components on a line basis in a main scanning direction and a second control circuit connected to the first control circuit to process the image data of each one of the plurality of color components transferred from the first control circuit and output the processed image data on a line basis as data to be output on an object. The first control circuit includes a plurality of registers provided for each one of the plurality of color components, each register being configured to store information indicating a number of pixels in the main scanning direction of one page of the image data of corresponding one of the plurality of color components, a calculation circuit connected to the plurality of registers and configured to calculate an assertion period for each of the plurality of color components based on the number of pixels stored in corresponding one of the plurality of registers, and determine the longest assertion period having a maximum value among the assertion periods calculated for each one of the plurality of color components, a plurality of addition circuits provided for each one of the plurality of color components and connected to a corresponding one of the plurality of registers and the calculation circuit, each of the plurality of addition circuits being configured to add dummy data to each line of the image data of corresponding one of the plurality of color components, and a transfer control circuit connected to the calculation circuit and the plurality of addition circuits, to generate an image data valid signal that is asserted for the longest assertion period and transmit the image data valid signal to the second control circuit. The first control circuit transfers the image data of each of the plurality of color components, in which the dummy data is added, to the second control circuit when the image data valid signal is asserted.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

DETAILED DESCRIPTION

Figure 1:
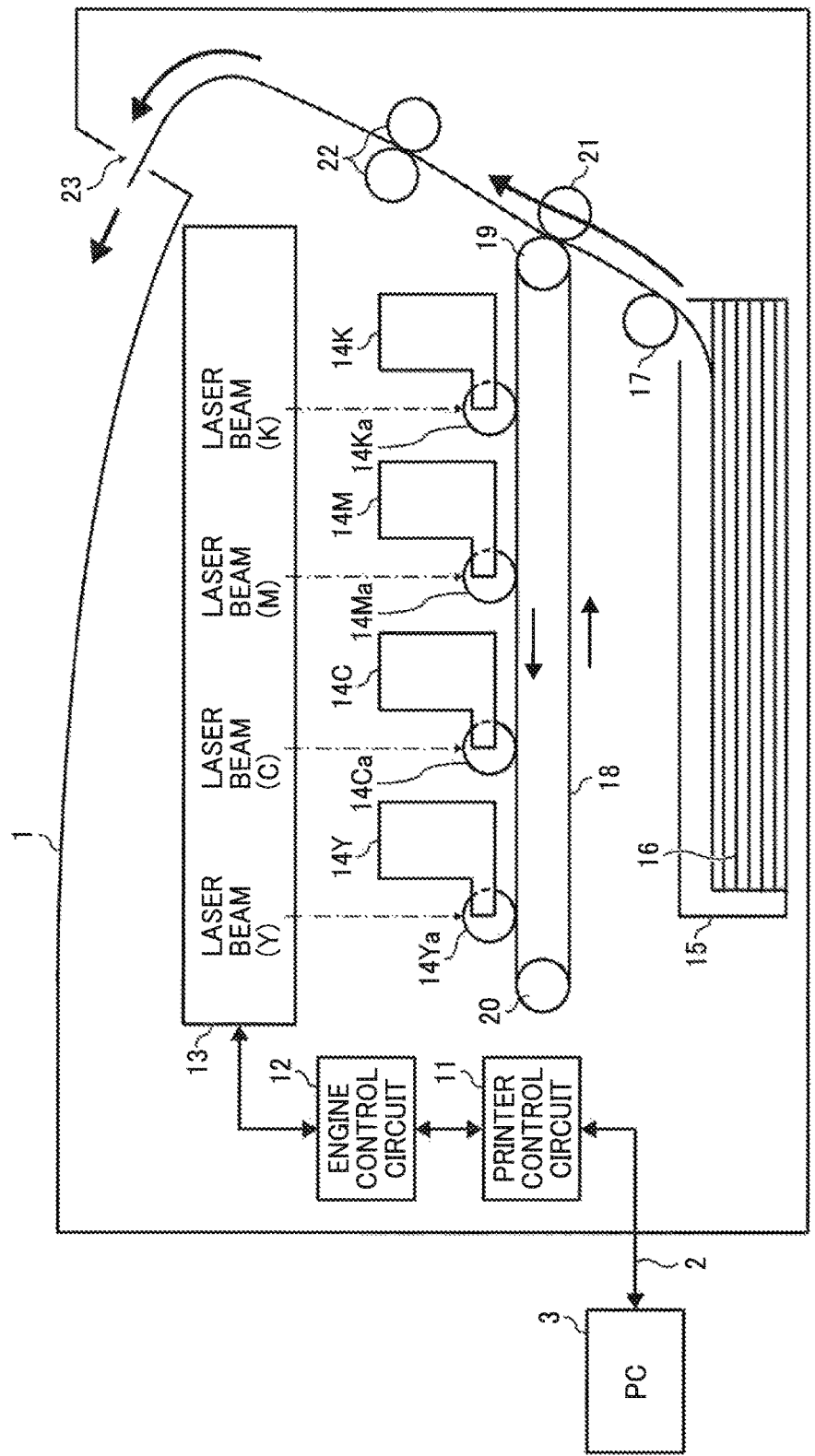
FIG. 1 is a schematic diagram illustrating a printer according to first embodiment.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. In describing example embodiments illustrated in the drawings, specific terminology is employed for the sake of clarity. However, the present disclosure is not intended to be limited to the specific terminology so selected and it is to be understood that each specific element includes all technical equivalents that operate in a similar manner.

A description is now given of exemplary embodiments of the present invention with reference to the drawings.

First Embodiment

FIG. 1 is a schematic diagram illustrating a printer 1 according to a first embodiment. The printer 1, which is one example of an image forming apparatus, is connected to a personal computer (PC) 3 via a network 2. The PC 3 sends to the printer 1 an electronic file of a document that is to be printed via the network 2. The printer 1 prints the document.

The printer 1 includes a printer control circuit 11, an engine control circuit 12, an exposure device 13, toner cartridges 14K, 14M, 14C, and 14Y, and a transfer belt 18.

The toner cartridges 14K, 14M, 14C, and 14Y include photoconductors 14Ka, 14Ma, 14Ca and 14Ya, respectively. Each of the photoconductors 14Ka, 14Ma, 14Ca and 14Ya is integrated with the corresponding one of the toner cartridges 14K, 14M, 14C, and 14Y. The printer 1 further includes a feed roller 17, a driving roller 19, a tension roller 20, a secondary transfer roller 21, and a fixing device 22 including a fixing roller and a pressure roller.

The printer control circuit 11 and the engine control circuit 12 are electrically connected with each other and constitute an image processing device in which the printer control circuit 11 transfers image data having a plurality of color components, namely, black (K), magenta (M), cyan (C), and yellow (Y), to the engine control circuit 12. The image data, here, has one or more paves and each pave of the image data has a plurality of pixels arranged in a main scanning direction and a sub-scanning direction. The printer control circuit 11 is a first control circuit that processes original image data, which is received from the PC 3 via the network, to generate K color (plate) image data, M color (plate) image data, C color (plate), image data, and Y color (plate) image data, and then transfers the image data on a line basis in the main scanning direction to the engine control circuit 12. The engine control circuit 12 is a second control circuit that processes the image data of each color component of K, M, C, and Y, which is transferred from the printer control circuit 11, to output the image data on a target object on a line basis. The engine control circuit 12 controls operations of the printer 1, including an image forming operation, a sheet conveying operation, and an image fixing operation. The engine control circuit 12 transmits the image data of each color component of K, M, C, and Y to the exposure device 13.

The exposure device 13 includes a laser light source that generates laser beams for writing images of K color, M color, C color, and Y color on the photoconductors 14Ka, 14Ma, 14Ca, and 14Ya, respectively, based on the image data of the respective color components of K, M, C, and Y that are transmitted from the engine control circuit 12. The laser light source may include, for example, a semiconductor laser and a He—Ne laser. The exposure device 13 writes the images on the photoconductors 14Ka, 14Ma, 14Ca, and 14Ya in a multi-line format by raster scanning of the laser beam.

The toner cartridges 14K, 14M, 14C, and 14Y contain black toner (K), magenta toner (M), cyan toner (C), and yellow toner (Y), respectively. Each of the toner cartridges 14K, 14M, 14C, and 14Y includes a paddle to stir toner, a charger, a developing device, and a roller to supply the toner to the developing device, a developing blade, a cleaner blade, etc.

The transfer belt 18 is an endless belt that stretches over the driving roller 19 and the tension roller 20 that are driven in rotation. The transfer belt 18 rotates counterclockwise in FIG. 1. The toner cartridges 14K, 14M, 14C, and 14Y are aligned in this order from the upstream side of the rotation direction.

As the exposure device 13 writes respective images on the photoconductors 14Ka, 14Ma, 14Ca, and 14Ya, the charger uniformly charges an outer peripheral surface of each of the photoconductors 14Ka, 14Ma 14Ca, and 14Ya. The outer peripheral surface of each of the photoconductors 14Ka, 14Ma, 14Ca, and 14Ya is exposed to a corresponding laser beam of K, M, C and Y generated from the exposure device 13. Through this operation, an electrostatic latent image is formed. Each developing device of the photoconductors 14Ka, 14Ma, 14Ca, and 14Ya develops the electrostatic latent image formed on the photoconductor surface with a corresponding toner of the black toner (K), magenta toner (M), cyan toner (C), and yellow toner (Y) into a toner image of the corresponding color of black (K), magenta (M), cyan (C), and yellow (Y). Each of the toner images is transferred from the surface of the corresponding one of the photoconductors 14Ka, 14Ma, 14Ca, and 14Ya onto the transfer belt 18 at a contacting position between each of the photoconductors 14Ka, 14Ma, 14Ca, and 14Ya and the transfer belt 18, to be superimposed one above the other. After each of the toner images is transferred, the unwanted toner left on the outer peripheral surface of each of the photoconductors 14Ka, 14Ma, 14Ca, and 14Ya is removed with the cleaner blade to be ready for a next image to be formed.

After the toner images of black (K), magenta (NI), cyan (C), and yellow (Y) are transferred on the transfer belt 18 one above the other to collectively form a toner image thereon, the toner image is conveyed with rotation of the transfer belt 18 to a position of the secondary transfer roller 21.

One or more sheets of paper 16, which are target objects on which the image data is to be output, are stacked in a paper feed tray 15. The sheet of paper 16 is conveyed in a direction indicated by bold arrows in FIG. 1. Each of the sheets of paper 16 can be defined by the main scanning direction and the sub-scanning direction that are corresponding to the main scanning direction and the sub-scanning direction of the image data. The main scanning direction of the sheet of paper 16 is a direction that is perpendicular to a conveying direction of the sheet of paper 16. The sub-scanning direction is a direction that is parallel to the conveying direction of the sheet of paper 16. With rotation of the feed roller 17, the one or more sheets of paper 16 are fed from the paper feed tray 15 one by one in order from the top of a stack of the sheets of paper 16. The sheet of paper 16 fed from the paper feed tray 15 is conveyed to the position of the secondary transfer roller 21, at which the sheet of paper 16 and the toner image formed on the transfer belt 18 face with each other. The secondary transfer roller 21 then transfers the toner image formed on the transfer belt 18 on the sheet of paper 16. After the secondary transfer roller 21 transfers the toner image formed on the transfer belt 18 on the sheet of paper 16, the fixing device 22 heats and press the toner image transferred on the sheet of paper 16 to fix the toner image onto the sheet of paper 16. The printer 1 discharges the sheet of paper 16 formed with the toner image onto a discharge tray 23.

The engine control circuit 12 determines a position of the toner image that is transferred with the transfer belt 18 as the transfer belt 18 rotates, and a size and a location of the sheet of paper 16, based on outputs from sensors that are provided at various locations in the printer 1.

The exposure device 13 and conveying devices including the feed roller 17 and the driving roller 19 constitute an output device of the printer 1. The output device outputs the image data of each color component of K, M, C, and Y, which is transferred from the printer control circuit 11 to the engine control circuit 12, to the sheet of paper 16 on a line basis under control of the engine control circuit 12.

Figure 2:
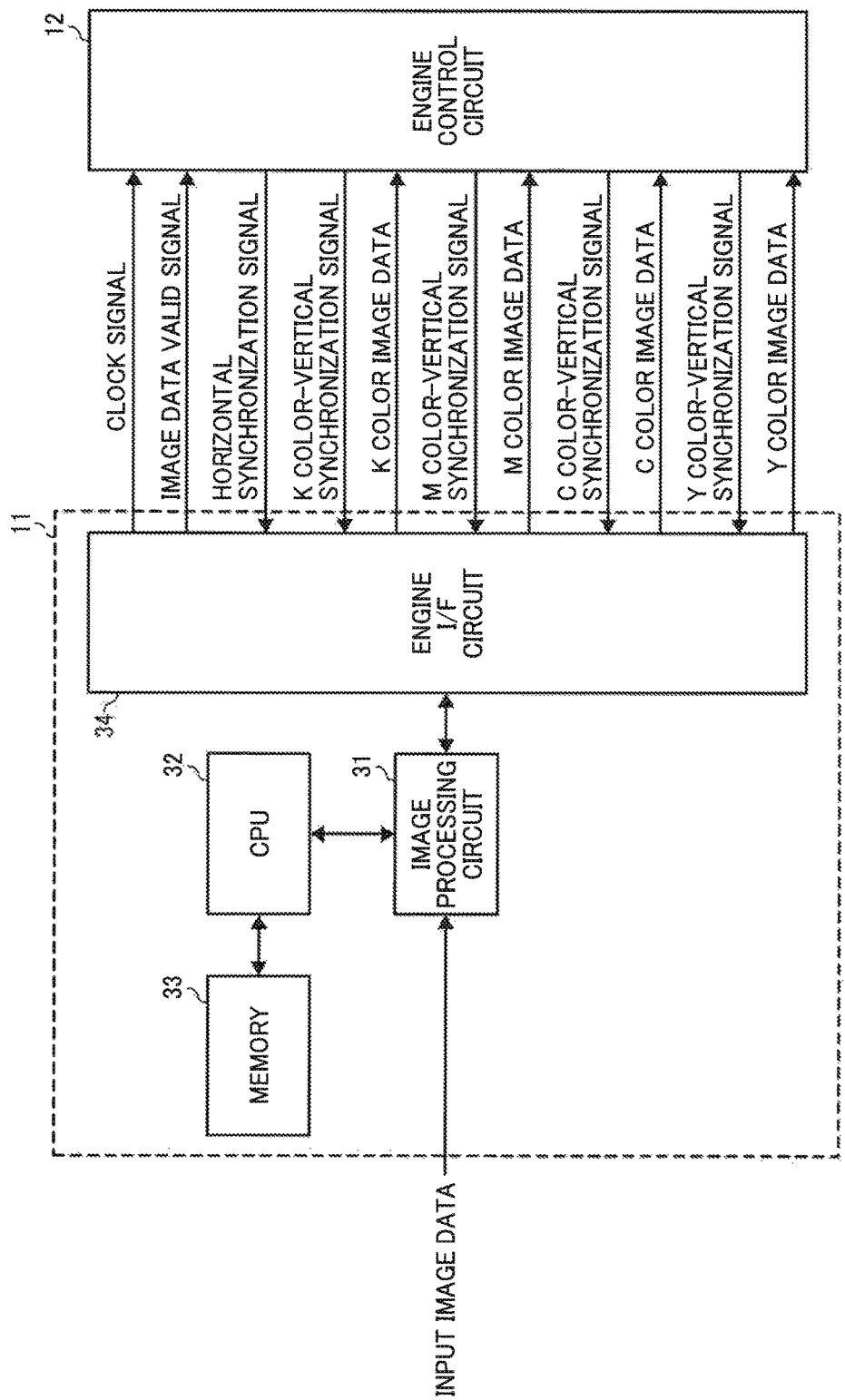
FIG. 2 is a block diagram illustrating signal transmission between a printer control circuit and an engine control circuit illustrated in FIG. 1.

FIG. 2 is a block diagram illustrating signal transmission between the printer control circuit 11 and the engine control circuit 12 of FIG. 1. The printer control circuit 11 includes an image processing circuit 31, a CPU 32, a memory 33, and an engine interface (I/F) circuit 34.

When receiving the image data input from the PC 3, the image processing circuit 31 stores the input image data in the memory 33 via an internal bus of the CPU 32, and generates the K color image data, M color image data, C color image data, and Y color image data according to an instruction of the CPU 32. The CPU 32 executes a program, for example, for communicating with an external device, such as the PC 3, and generating the image data of each color component of K, M, C, and Y using a function of the image processing circuit 31. When the printer 1 includes operation devices such as a user input device and a display device, the CPU 32 executes a program for controlling operations of such devices. The memory 33 serves as a storage area for storing the input image data, and a work area used for generating the image data of each color component of K, M, C, and Y. The memory 33 also serves as another storage area for storing the generated image data of each color component of K, M, C, and Y, and another work area used for programs executed with the CPU 32. The image processing circuit 31 generates the image data of each color component of K, M, C, and Y and then sends the generated image data to the engine I/F circuit 34. The image processing circuit 31 and the engine I/F circuit 34 are connected to each other using, for example, a peripheral component interconnect (PCI) express. The engine I/F circuit 34 transfers the image data of each color component of K, M, C, and Y transferred from the image processing circuit 31 to the engine control circuit 12 on a line basis according to an interface specification between the engine I/F circuit 34 and the engine control circuit 12.

The engine control circuit 12 processes the image data of each color component of K, M, C, and Y, transferred from the engine I/F circuit 34 of the printer control circuit 11, to output the processed image data on the sheet of paper 16 on a line basis.

The engine I/F circuit 34 transfers the image data of each color component of K, M, C, and Y to the engine control circuit 12 on a line basis with a predetermined bus width which may differ for each color component. The following is a description of when a bus width of four bits is assigned to all of the color components of K, M, C, and Y.

The engine I/F circuit 34 transfers the image data to the engine control circuit 12 using signals described below. The engine circuit 34 sends a clock signal and an image data valid signal to the engine control circuit 12. The engine control circuit 12 sends a single horizontal synchronization signal and vertical synchronization signals to the engine I/F circuit 34. Each vertical synchronization signal is corresponding to one of the color components of K, M, C, and Y (K color-vertical synchronization signal, M color-vertical synchronization signal, C color-vertical synchronization signal, and Y color-vertical synchronization signal).

The clock signal is a reference signal to be used by the engine control circuit 12 to read the image data of each color component of K, M, C, and Y transferred from the engine I/F circuit 34, such that the times for reading the image data are synchronized for all of the color components. The engine control circuit 12 reads the image data at a rising edge of the clock signal. Alternatively, the engine control circuit 12 may read the image data at both of the rising edge and a falling edge of the clock signal.

The image data valid signal indicates that the image data output from the engine I/F circuit 34 is valid, or a valid area of the image data.

The horizontal synchronization signal indicates a range of the main scanning direction of the sheet of paper 16, which is the target object on which the image data is output. The horizontal synchronization signal is a signal that is asserted for each line of the sheet of paper 16. An assertion period of the horizontal synchronization signal depends on a conveying speed of the sheet of paper 16 and resolution of the image data. The engine I/F circuit 34 begins to transfer the image data corresponding to one line in response to receiving the horizontal synchronization signal.

Each of the vertical synchronization signals for the K color (image data), M color (image data), C color (image data), and Y color (image data) indicates a range of the sub-scanning direction of the sheet of paper 16 for a corresponding color component, which is the target object, on which the image data of each color component is output. Each vertical synchronization signal for one of the K color, M color, C color, and Y color is asserted at a head of each page of the sheet of paper 16, and negated at an end of the same page, with respect to a corresponding color component.

The engine I/F circuit 34 transfers the K color image data in synchronization with the clock signal to the engine control circuit 12 when both of the image data valid signal and the vertical synchronization signal for the K color are asserted. The engine I/F circuit 34 also transfers the C color image data, M color image data, and Y color image data to the engine control circuit 12 in the same way as the K color image data.

Figure 3:
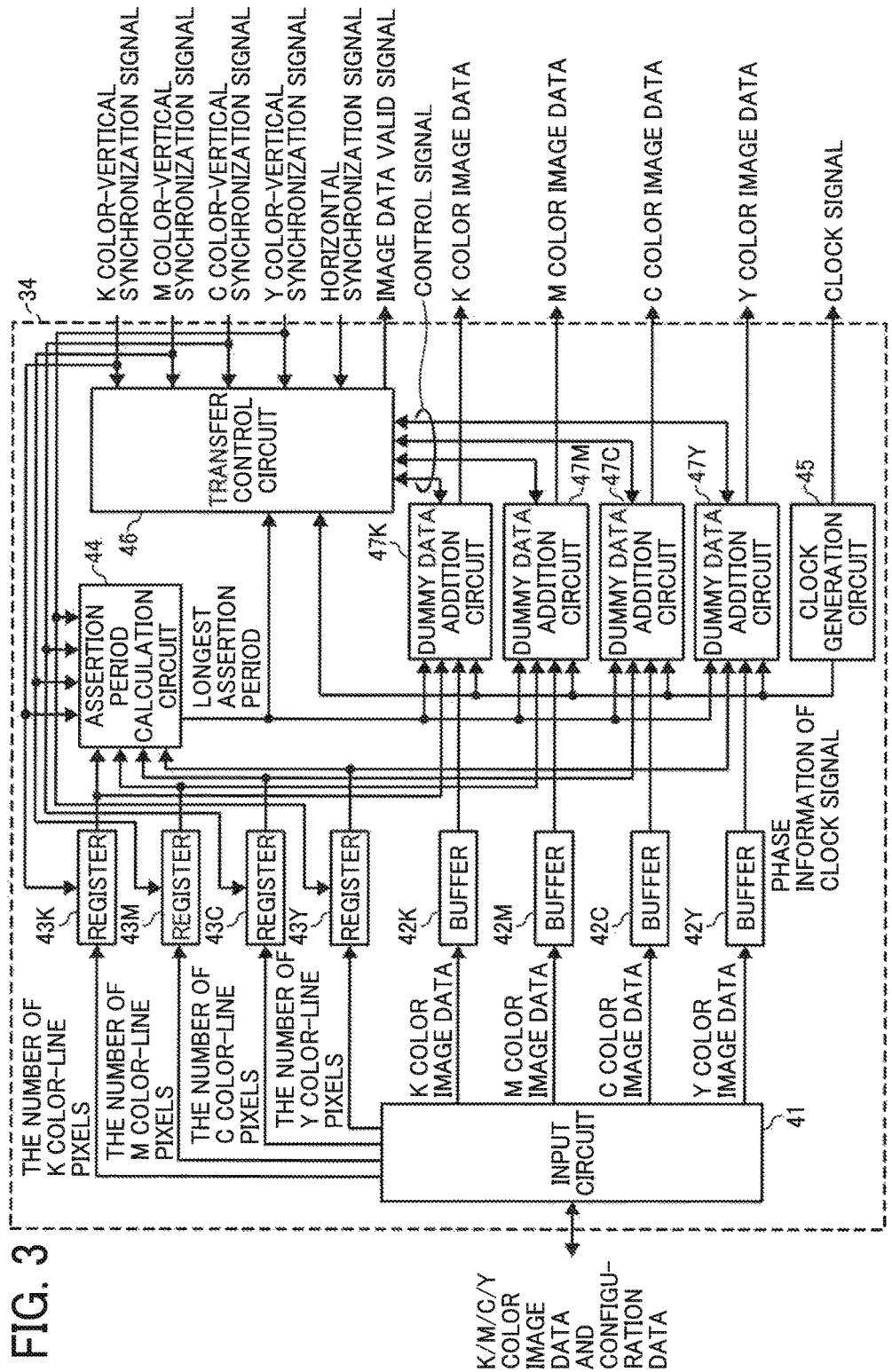
FIG. 3 is a block diagram illustrating an internal configuration of an engine interface (I/F) circuit illustrated in FIG. 2.

FIG. 3 is a block diagram illustrating an internal configuration of the engine I/F circuit 34 of FIG. 2. The engine I/F circuit 34 includes an input circuit 41, buffers 42K, 42M, 42C, and 42Y, registers 43K, 43M, 43C, and 43Y, an assertion period calculation circuit 44, a clock generation circuit 45, a transfer control circuit 46, and dummy data addition circuits 47K, 47M, 47C, and 47Y. The input circuit 41 is electrically connected to the buffers 42K, 42M, 42C, and 42Y and registers 43K, 43M, 43C, and 43Y. The buffers 42K, 42M, 42C, and 42Y are also electrically connected to the dummy data addition circuits 47K, 47M, 47C, and 47Y, respectively. The registers 43K, 43M, 43C, and 43Y are also electrically connected to the dummy data addition circuits 47K, 47M, 47C, and 47Y, respectively, and to the assertion period calculation circuit 44, and the transfer control circuit 46. In addition, the assertion period calculation circuit 44 is electrically connected to the transfer control circuit 46 and the dummy data addition circuits 47K, 47M, 47C, and 47Y. Additionally, the clock generation circuit 45 is electrically connected to the transfer control circuit 46 and the dummy data addition circuits 47K, 47M, 47C, and 47Y.

The input circuit 41 receives the image data of color components of K, M C, and Y from the image processing circuit 31, and sends the image data of color components of K, M, C, and Y to the buffers 42K, 42M, 42C and 42Y, respectively, on a line basis. In addition to the image data, the input circuit 41 receives configuration data that is a parameter for transferring the image data from the CPU 32 via the image processing circuit 31. The configuration data defines, for example, the number of line pixels (the number of pixels per line), which indicates the number of pixels in the main scanning direction, included in one page of the image data of each color component of K, M, C, and Y. The number of line pixels of the image data of each color component of K, M, C, and Y may be referred to as the number of K color-line pixels, the number of M color-line pixels, the number of C color-line pixels, and the number of Y color-line pixels. The input circuit 41 writes the number of line pixels of each color component of K, M, C, and Y received from the CPU 32 via the image processing circuit 31 to each of the registers 43K, 43M, 43C, and 43Y.

The buffers 42K, 42M, 42C, and 42Y temporarily store the image data of respective color components of K, M, C, and Y. The buffer 42K has two storage areas each of which can store one line of K color image data, that is, the buffer 42K can store the image data corresponding to two lines. When the K color image data is written to one of the storage areas of the buffer 42K from the input circuit 41, the K color image data stored in the other storage area of the buffer 42K is read out and sent to the dummy data addition circuit 47K in a subsequent stage. The buffer 42K, accordingly, can concurrently perform write and read of the image data by toggle-control of the two storage areas. The buffers 42M, 42C, and 42Y are also configured and operate in the same way as the buffer 42K.

The registers 43K, 43M, 43C, and 43Y each store the number of line pixels of the corresponding one of the K color, M color, C color, and Y color. The registers 43K, 43M, 43C, and 43Y operate respectively based on the vertical synchronization signals for the K color, M color, C color, and Y color. The register 43K includes a first storage area for a present page of the K color image data, and a second storage area for a next page of the K color image data. The register 43K updates contents of the first storage area based on contents of the second storage area, and writes the number of line pixels of the next page of the K color image data in the second storage area, when the K color-vertical vertical synchronization signal is asserted (for example, at a rising edge of the signal). The K color-vertical synchronization signal is asserted and the number of line pixels stored in the register 43K is updated, and thereby the CPU 32 can write the number of line pixels of the next page to the register 43K while the present page is printed. The registers 43M, 43C, and 43Y are also configured and operate in the same way as the register 43K.

The assertion period calculation circuit 44 calculates an assertion period for each color component of K, M, C, and Y (K color-assertion period, M color-assertion period, C color-assertion period, and Y color-assertion period) based on the number of line pixels stored in the corresponding one of the registers 43K, 43M, 43C, and 43Y and the bus width. Each assertion period for one of the color components of K, M, C, and Y indicates a time required to transfer the corresponding color image data corresponding to one line to the engine control circuit 12. After calculating each assertion period, the assertion period calculation circuit 44 determines which one of the assertion periods for the K color, M color, C color, and Y color has the maximum value to indicate the longest assertion period. The assertion period calculation circuit 44 sends the longest assertion period to the transfer control circuit 46 and the dummy data addition circuits 47K, 47M, 47C, and 47Y.

The assertion period calculation circuit 44 may calculate the assertion period for the color component for which the vertical synchronization signal is asserted for a page of the image data, except for the color component for which the vertical synchronization signal is negated for the page of the image data. The calculation of the assertion periods except for the color component, for which the vertical synchronization signal is negated, can eliminate influence of the excluded color component on the longest assertion period.

For example, the longest assertion period is determined as described below when all of the vertical synchronization signals for the K color, M color, C color, and Y color are asserted. The bus width assigned to all of the K color, M color, C color, and Y color is four bits as described above. For example, when the number of line pixels of the K color is 4096 pixels and the number of pixel bits (the number of bits per pixel) of the K color is 1 bit/pixel, the assertion period for the K color is as follows: 4096[pixel]×1[bit/pixel]÷4[bit/clock]=1024 clocks. For each color component of M, C, and Y, when the number of line pixels is 4000 pixels and the number of pixel bits is 1 bit/pixel, each assertion period for the M color, C color, and Y color is as follows: 4000[pixel]×1[bit/pixel]÷4[bit/clock]=1000 clocks. In this example, the assertion period for the K color is 1024 clocks and each assertion period for the M color, C color, and Y color is 1000 clocks, so that the assertion period calculation circuit 44 determines "1024 clocks" is the longest assertion period. Under the condition of the above-mentioned example, when the vertical synchronization signal for the K color is negated and the vertical synchronization signals for the M color, C color, and Y color are asserted, the assertion period for the K color is 0 clock and each assertion period for the M color, C color, and Y color is 1000 clocks. The assertion period calculation circuit 44, accordingly, determines "1000 clocks" is the longest assertion period.

The clock generation circuit 45 generates the clock signal by frequency dividing an operation clock of the engine I/F circuit 34. The clock generation circuit 45 sends a divided counter value, which is phase information of the clock signal, to the transfer control circuit 46 and the dummy data addition circuits 47K, 47M, 47C, and 47Y. The phase information of the clock signal is used for detecting the rising edge and the falling edge of the clock signal.

The transfer control circuit 46 generates the image data valid signal and then transmits the image data valid signal to the engine control circuit 12. When the image data valid signal is asserted, the image data of each color component of K, M, C, and Y is sent from the printer control circuit 11 to the engine control circuit 12. The transfer control circuit 46 sends to or receives from the dummy data addition circuits 47K, 47M, 47C, and 47Y, control signals used for transferring the image data from the printer control circuit 11 to the engine control circuit 12.

The dummy data addition circuits 47K, 47M, 47C, and 47Y add dummy data respectively to the line of the image data of the color components of K, M, C, and Y. The dummy data has an amount of data that is equal to a difference between an amount of one line of the image data of each color component and an amount of image data to be transferred with the bus width of the corresponding color component over the longest assertion period. The dummy data may be, for example, white data or achromatic data. The image data in which the dummy data is added is finally transferred from the printer control circuit 11 to the engine control circuit 12.

The transfer control circuit 46 and the dummy data addition circuits 47K, 47M, 47C, and 47Y operate as described below to transfer the image data from the printer control circuit 11 to the engine control circuit 12.

The transfer control circuit 46 determines whether each vertical synchronization signal, for one of the color components of K, M, C, and Y, is asserted when the horizontal synchronization signal is asserted. The transfer control circuit 46 sends first control signals to the dummy data addition circuits 47K, 47M, 47C, and 47Y individually, to instruct the dummy data addition circuits 47K, 47M, 47C, and 47Y to start preparation for transfer of the corresponding color image data for which the corresponding vertical synchronization signal is asserted.

When receiving the first control signal, which instructs the start of preparing the transfer of image data, the dummy data addition circuit 47K calculates an amount of one line of the K color image data based on the number of line pixels stored in the register 43K and the bus width for the K color. Subsequently, the dummy data addition circuit 47K notifies the buffer 42K of completion of preparation for receiving the K color image data, and reads the one line of K color image data from the buffer 42K. The dummy data addition circuit 47K then sends a second control signal to the transfer control circuit 46 to notify the transfer control circuit 46 of completion of preparation for the transfer. The dummy data addition circuits 47M, 47C, and 47Y also operate in the same way as the dummy data addition circuit 47K.

When receiving the notification of the completion of preparation for the transfer from all of the dummy data addition circuits 47K, 47M, 47C, and 47Y, the transfer control circuit 46 sends third control signals to the dummy data addition circuits 47K, 47M, 47C, and 47Y, individually. The third signal is a signal that instruct each of the dummy data addition circuits 47K, 47M, 47C, and 47Y to start the transfer of the image data. The transfer control circuit 46 further asserts the image data valid signal. At this time, all of the dummy data addition circuits 47K, 47M, 47C, and 47Y have the same time period between the receipt of the instruction for starting the transfer and the output of the image data, namely, the same output delay time. The transfer control circuit 46, accordingly, determines when to assert the image data valid signal, for example, the rising edge, by reflecting the output delay time, so that output of the image data of each color components of K, M, C, and Y can be synchronized with the assertion period of the image data valid signal. The transfer control circuit 46 also determines when to assert the image data valid signal and when to send the third control signals, which instruct to start the transfer of image data, by referring to the phase information of the clock signal output from the clock generation circuit 45. The transfer control circuit 46 determines the above-mentioned timing in a manner that the clock signal, the image data valid signal, and the image data of each color components of K, M, C and Y to be transferred from the printer control circuit 11 to the engine control circuit 12 are synchronized with each other.

The following describes how the K color image data is transferred from the dummy data addition circuit 47K, when the K color-assertion period is not the longest assertion period or when the K color-assertion period is the longest assertion period and an amount of one line of the K color image data is not an integral multiple of the bus width, which will be described later. The dummy data addition circuit 47K starts outputting the K color image data to the engine control circuit 12 in response to the receipt of the instruction for starting the transfer of image data from the transfer control circuit 46. The dummy data addition circuit 47K outputs, at first, K color image data corresponding to one line read from the buffer 42K. After outputting all of the image data read from the buffer 42K, the dummy data addition circuit 47K outputs the dummy data and continues to output the dummy data until the end of the longest assertion period. The dummy data addition circuits 47M, 47C, and 47Y also operate in the same way as the dummy data addition circuit 47K.

The printer control circuit 11 transfers the image data and the dummy data output from each of the dummy data addition circuits 47K, 47M, 47C, and 47Y to the engine control circuit 12.

Figure 4:
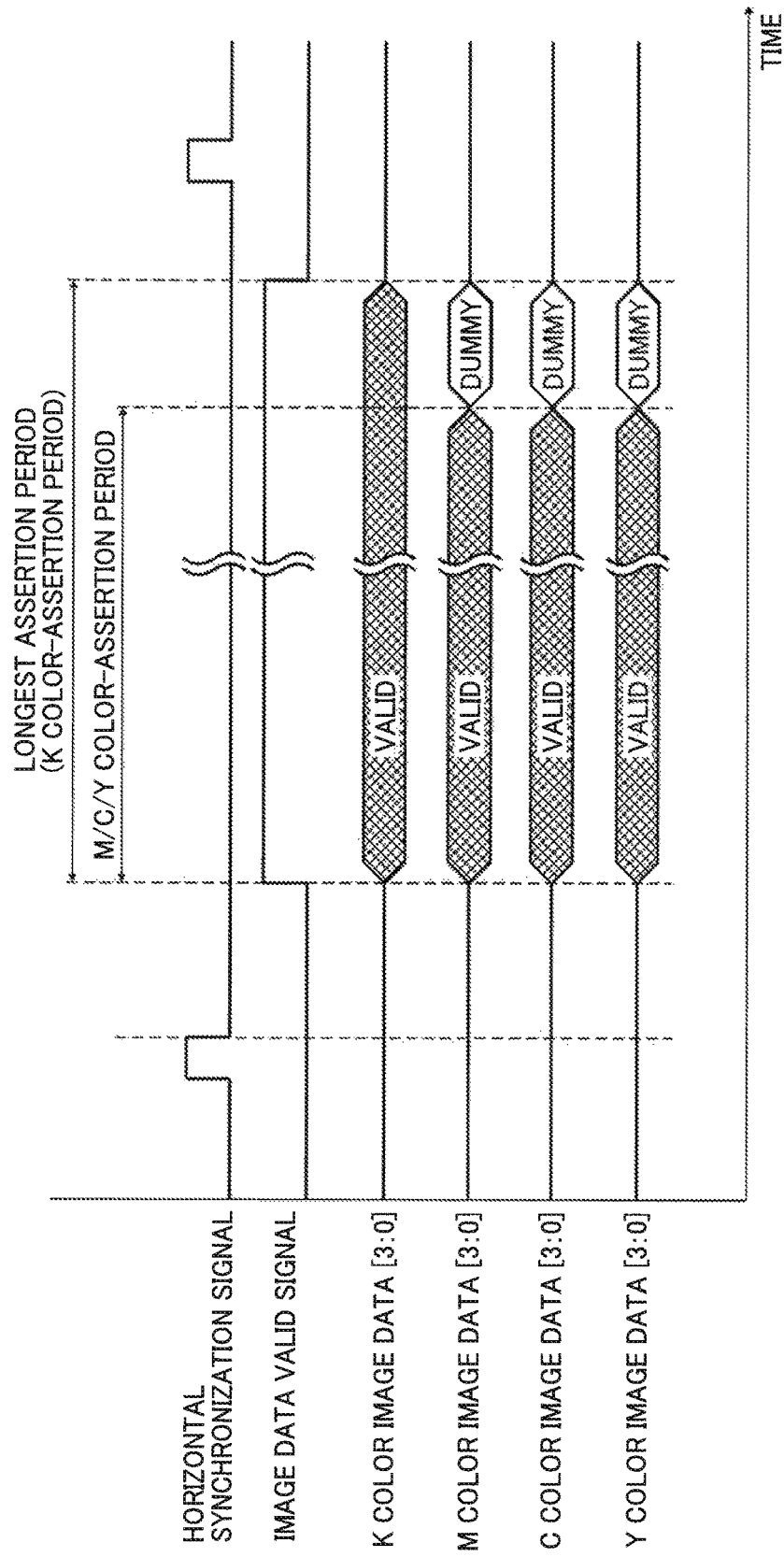
FIG. 4 is a timing chart illustrating an example of the signal transmission between the printer control circuit and the engine control circuit illustrated in FIG. 2.

FIG. 4 is a timing chart illustrating an example of signal transmission between the printer control circuit 11 and the engine control circuit 12 as illustrated in FIG. 2. As described above, the bus width [3:0] having four bits is assigned to all of the K color, M color, C color, and Y color image data. In FIG. 4, "valid" indicates the valid image data read from the buffers 42K, 42M, 42C, and 42Y to the dummy data addition circuits 47K, 47M, 47C, and 47Y, respectively. In FIG. 4, "dummy" indicates the dummy data added by the dummy data addition circuits 47M, 47C, and 47Y to the respective M color, C color, and Y color image data. As the example illustrated here, the number of line pixels of the K color is 4096 pixels, the number of pixel bits of the K color is 1 bit/pixel, the number of line pixels of each of the M color, C color, and Y color is 4000 pixels, and the number of pixel bits of each of the M color, C color, and Y color is 1 bit/pixel. With this case, the assertion period for the K color image data is as follows: 4096[pixel]×[bit/pixel]÷4[bit/clock]=1024 clocks. The assertion period for each of the M color image data, C color image data, and Y color image data is as follows: 4000[pixel]×1[bit/pixel]÷4[bit/clock]=1000 clocks. The assertion period calculation circuit 44, accordingly, determines that "1024 clocks" is the longest assertion period. Regarding the K color component, the valid image data corresponding to 1024 clocks is output during the assertion period. Regarding the M color, C color, and Y color, valid image data corresponding to 1000 clocks is output at first, and then the dummy data is output during the period from 1001st clock to 1024th clock.

In the example of FIG. 4, the K color-assertion period is the longest assertion period, however, when the assertion period for one of the M color, C color, and Y color is the longest assertion period, the dummy data can be added to the image data, having a shorter assertion period than the longest assertion period such as the K color image data, as well. In addition, in the example of FIG. 4, there are two different assertion periods (1024 clocks and 1000 clocks), however, when there are three or more different assertion periods, the dummy data can be added to the image data having a shorter assertion period than the longest assertion period.

In the example of FIG. 4, an amount of one line of the image data of each color component of K, M, C, and Y is integral multiple of the bus width (4 bits), however this condition is not always established. This will be explained below with reference to FIG. 5.

Figure 5:
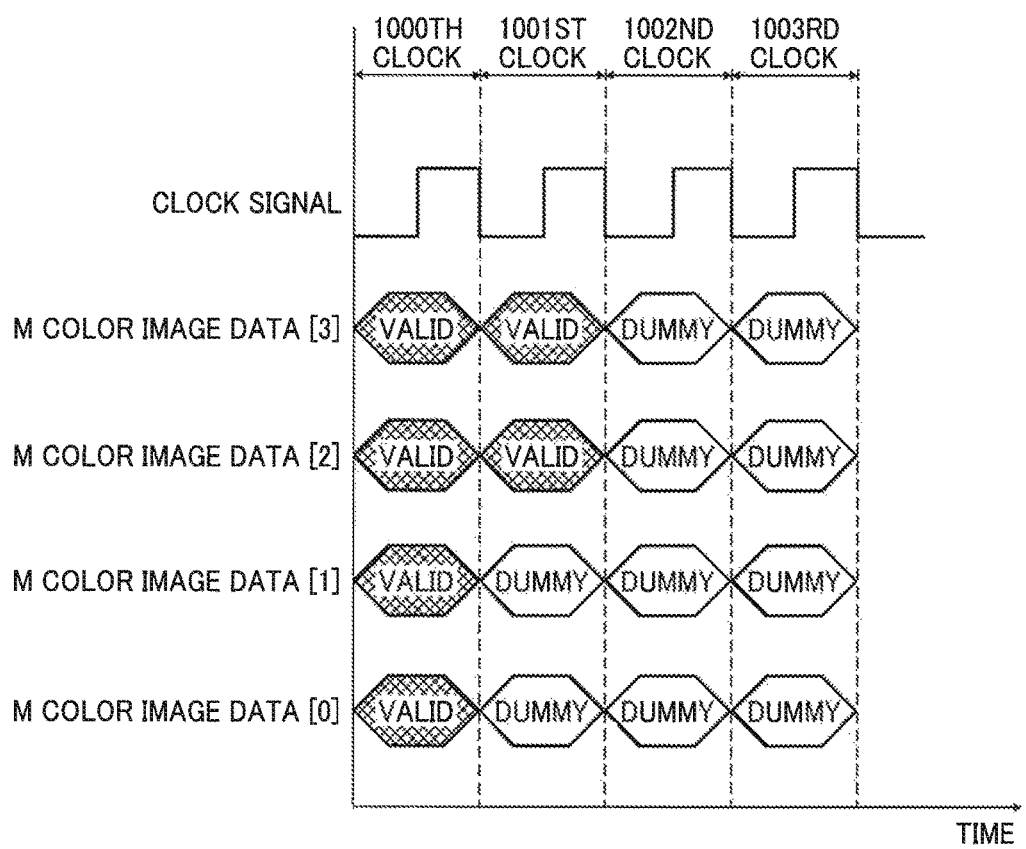
FIG. 5 is a timing chart illustrating an example of the signal transmission between the printer control circuit and the engine control circuit illustrated in FIG. 2 when an amount of M color image data is not an integer multiple of a bus width.

FIG. 5 is a timing chart illustrating an example of the signal transmission between the printer control circuit 11 and the engine control circuit 12 as illustrated in FIG. 2 when an amount of M color image data is not an integral multiple of the bus width. As described above, the bus width [3:0] having four bits is assigned to the all image data of K color, M color, C color, and Y color. As the example illustrated here, the number of line pixels of the K color is 4096 pixels, the number of pixel bits of the K color is 1 bit/pixel, the number of line pixels of each of the M color, C color, and Y color is 4002 pixels, and the number of pixel bits of each of the M color, C color, and color is 1 bit/pixel. With this case, the assertion period for the K color image data is as follows: 4096[pixel]×1[bit/pixel]÷4[bit/clock]=1024 clocks. The assertion period for each of the M color image data, C color image data, and Y color image data is as follows: 4002[pixel]×1[bit/pixel]÷4[bit/clock]=1000.5 clocks. The decimal point is round up and the assertion period is 1001 clocks. The assertion period calculation circuit 44 determines that "1024 clocks" is the longest assertion period. The dummy data addition circuit 47M adds an amount of dummy data that is equal to a difference between an amount of one line of the M color image data and an amount of M color image data transferred during the longest assertion period with the bus width assigned to the M color. That is, there is a clock having both of the valid image data and the dummy data on the bus for the M color. At a 1001st clock, bit [3:2] of the M color image data [3:0] is the valid image data, and bit [1:0] of the M color image data [3:0] is the dummy data. In this example, the number of line pixels and the number of pixel bits of each of the M color, C color, and Y color has the same numbers. The image data of C color and Y color, accordingly, also includes the valid image data and the dummy data at the 1001st clock as well as the image data of M color.

When an amount of one line of the image data of one of the color components having the assertion period equal to the longest assertion period is not an integral multiple of the bus width, the dummy data is added to each line of the image data of the color component as well.

In the above-mentioned description, the bus width having four bits is assigned to all image data of the color components of K, M, C, and Y. The bus width, however, may not have the same number of bits for all the color components of K, M, C, and Y, and may differ for each color component. Additionally, the bus width may have 1 bit. When the bus width has 1 bit, the assertion period calculation circuit 44 calculates the assertion period for each color component of K, M, C, and Y based on only the number of line pixels of each color component stored in the corresponding one of the registers 43K, 43M, 43C, and 43Y, and determine the longest assertion period. Similarly, each of the dummy data addition circuits 47K, 47M, 47C, and 47Y can calculate an amount of one line of the image data of a corresponding color component of K, M, C, and Y based only on the number of line pixels of the corresponding color component stored in the corresponding one of the registers 43K, 43M, 43C, and 43Y.

With the printer 1 according to the first embodiment, the printer control circuit 11 transmits the image data valid signal to the engine control circuit 12, and thus the engine control circuit 12 can define a valid area of the received image data based on the image data valid signal. Consequently, the printer 1 according to the first embodiment can reduce, in the engine control circuit 12, the influence of noise on the control of the transfer of image data and thereby, can form a high quality image with low cost.

With the printer 1 according to the first embodiment, the assertion period calculation circuit 44 can determine the longest assertion period based on the number of line pixels of each color component stored in the corresponding one of the registers 43K, 43M, 43C, and 43Y. Additionally, the transfer control circuit 46 can assert the image data valid signal based on the longest assertion period determined with the assertion period calculation circuit 44. Consequently, the printer 1 according to the first embodiment can improve the efficiency of the transfer of image data by determining the assertion period of the image data valid signal according to variation of format of the image data (for example, variation of the number of line pixels for each color component or for each page).

When the engine I/F circuit 34 does not include the registers 43K, 43M, 43C, and 43Y, performance degradation as described below may occur. The CPU 32 needs to notify the assertion period calculation circuit 44 and the dummy data addition circuits 47K, 47M, 47C, and 47Y of the number of line pixels of each color component of K, M, C, and Y when the image data is not transferred from the printer control circuit 11 to the engine control circuit 12. This notification is performed while the printer control circuit 11 processes a gap between pages of the image data, namely, while each vertical synchronization signal for the K color, M color, C color, and Y color is negated. The time for processing the gap between pages of the image data increases due to this notification. Increasing the time for processing the gap reduces a transfer speed of the image data from the printer control circuit 11 to the engine control circuit 12, and decreases a printing speed of the printer 1, accordingly. The printer 1 according to the first embodiment in which the engine I/F circuit 34 includes the registers 43K, 43M, 43C, and 43Y each update contents including the number of line pixels when the vertical synchronization signal for each of the K color, M color, C color, and Y color is asserted. This can prevent decrease of the transfer speed of the image data transferred from the printer control circuit 11 to the engine control circuit 12 and prevent decrease of the printing speed, accordingly.

As described above, the printer 1 according to the first embodiment can reduce the influence due to the noise occurring during the transfer of image data while improving the efficiency of the transfer of image data according to the variation of the format of the image data.

Second Embodiment

Figure 6:
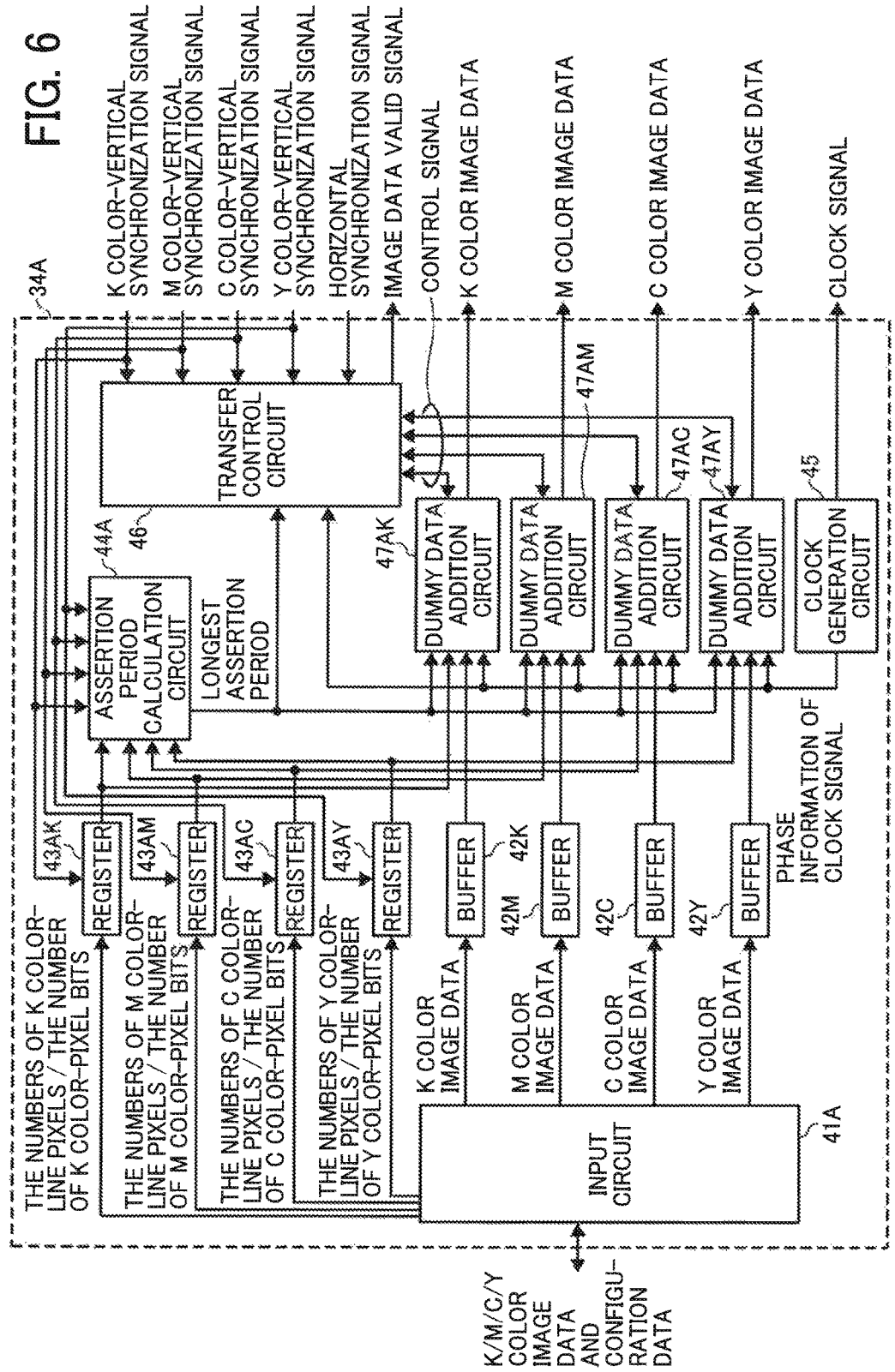
FIG. 6 is a schematic diagram illustrating an internal configuration of an engine interface (I/F) circuit of a printer according to a second embodiment.

FIG. 6 is a schematic diagram illustrating an internal configuration of an engine interface (I/F) circuit 34A of a printer according to a second embodiment. According to the second embodiment, the number of pixel bits (the number of bits per pixel) that is an amount of information for a pixel of the image data of each color component of K, M, C, and Y is also used to calculate an assertion period and the longest assertion period, in addition to the number of line pixels (the number of pixels per line) of the image data of each color component of K, M, C, and Y color. The numbers of pixel bits of the image data of each color component of K, M, C, and Y may be referred to as the number of K color-pixel bits, the number of M color-pixel bits, the number of C color-pixel bits, and the number of Y color-pixel bits, respectively.

The engine I/F circuit 34A of FIG. 6 includes an input circuit 41A, buffers 42K, 42M, 42C, and 42Y, registers 43AK, 43AM, 43AC, and 43AY, an assertion period calculation circuit 44A, a transfer control circuit 46, and dummy data addition circuits 47AK, 47AM, 47AC, and 47AY. The buffers 42K, 42M, 42C, and 42Y, the clock generation circuit 45, and the transfer control circuit 46 are configured and operate in the same way as the corresponding elements illustrated in FIG. 3.

The input circuit 41A writes the number of line pixels and the number of pixel bits of the image data of each color component of K, M, C, and Y received from the CPU 32 via the image processing circuit 31 to the corresponding one of the registers 43AK, 43AM, 43AC, and 43AY.

The registers 43AK, 43AM, 43AC, and 43AY store the number of line pixels and the number, of pixel bits for the K color, M color, C color, and Y color, respectively.

The assertion period calculation circuit 44A calculates the assertion period for each color component of K, M, C, and Y based on the number of line pixels and the number of pixel bits stored in the corresponding one of the registers 43AK, 43AM, 43AC, and 43AY individually and a bus width. The assertion period calculation circuit 44A then determines the longest assertion period.

The dummy data addition circuit 47AK calculates an amount of one line of the K color image data based on the number of the line pixels and the number of pixel bits stored in the register 43AK and the bus width for the K color. The dummy data addition circuits 47AM, 47AC, and 47AY also operate in the same way as the dummy data addition circuit 47AK.

Except for the above-mentioned operations, the input circuit 41A, the registers 43AK, 43AM, 43AC, and 43AY the assertion period calculation circuit 44A, and the dummy data addition circuits 47AK, 47AM, 47AC, and 47AY are configured and operate in the same way as the corresponding elements illustrated in FIG. 3.

For example, the longest assertion period is determined as described below when all of the vertical synchronization signals for the K color, M color, C color, and Y color are asserted. Here, the bus width assigned to all of the K color, M color, C color, and Y color is four bits. For example, when the number of line pixels of the K color is 2048 pixels and the number of pixel bits of the K color is 2 bit/pixel, the assertion period for the K color is as follows: 2048[pixel]× 2[bit/pixel]÷4[bit/clock]=1024 clocks. For each color component of M, C, and Y when the number of line pixels is 4000 pixels and the number of pixel bits is 1 bit/pixel, each assertion period for the M color, C color, and Y color is as follows: 4000[pixel]×1[bit/pixel]÷4[bit/clock]=1000 clocks. In this example, the assertion period for the K color is 1024 clocks and each assertion period for the M color, C color, and Y color is 1000 clocks, so that the assertion period calculation circuit 44 determines "1024 clocks" is the longest assertion period.

The printer according to the second embodiment can reduce the influence due to noise occurring during the transfer of image data while improving the efficiency of the transfer of image data according to variation of format of the image data as well as the first embodiment.

The printer according to the second embodiment can determine the longest assertion period correctly based on the number of pixel bits stored in each of the registers 43AK, 43AM, 43AC, and 43AY even when the number of pixel bits of each color component is different from one another.

The image processing device according to the embodiments of the disclosure can be used for not only printers but also other types of image forming apparatuses including copiers and multifunction peripheral. When the image processing device according to the embodiments is used with a copier, a scanner built in the copier or the like inputs image data to the printer control circuit 11, instead of the external PC 3.

The image forming apparatus according to at least one of the embodiments can reduce the influence of noise occurring during the transfer of image data while improving the efficiency of transfer of image data according to a variation of format of the image data.

The image forming apparatus according to at least one of the embodiments can determine the assertion period correctly even when not all bus widths for each color component have the same value by further reflecting the bus width for each color component determined in advance.

The image forming apparatus according to at least one of the embodiments further can determine the assertion period correctly in the case that an amount of information per pixel for each color component is different from each other by further reflecting the amount of information per pixel of the image data.

Additionally, the image forming apparatus according to at least one of the embodiments can correctly synchronize the operations of the first control circuit and the second control circuit with each other by transmitting the horizontal synchronization signal and vertical synchronization signal from the second control circuit to the first control circuit.

The image forming apparatus according to at least one of the embodiments can write the configuration data for a next page in the registers before the completion of printing of a present page by including the first storage area and the second storage area. This also can distribute the load of page switching in terms of time.

The image forming apparatus according to at least one of the embodiments can determine whether the vertical synchronization signals for each color component is asserted when the horizontal synchronization signal is asserted, so that can ignore the change of the vertical synchronization signal while the horizontal synchronization signal is not asserted. This can simplify the control of transfer timing due to the vertical synchronization.

Additionally, the image forming apparatus according to at least one of the embodiments can determine the longest assertion period correctly even when the input image data include not all of the color components by ignoring the color component for which the vertical synchronization signal is negated.

Although the exemplary embodiments of the invention have been described and illustrated above, such description is not intended that the disclosure be limited to the illustrated embodiments. Numerous additional modifications and variations are possible in light of the above teachings. It is therefore to be understood that within the scope of the appended claims, the embodiments may be practiced otherwise than as specifically described herein. For example, elements and/or features of different illustrative embodiments may be combined with each other and/or substituted for each other within the scope of this disclosure and appended claims.

What is claimed is:

1. An image processing device comprising: a first control circuit configured to include a plurality of registers, a calculation circuit, a plurality of addition circuits and a transfer control circuit, to transfer, for each color component amongst a plurality of color components, image data of the color component on a line basis, for a plurality of lines, in a main scanning direction, the image data transferred on the line basis for the plurality of lines collectively constituting one or more pages; and a second control circuit connected to the first control circuit to process the image data transferred, for said each color component amongst the plurality of color components, from the first control circuit and output the processed image data on a line basis as data to be output on an object, the first control circuit and the second control circuit operating in combination to perform a process comprising:

(a) storing, for each color component amongst the plurality of color components, in a register provided for the color component, from amongst the plurality of registers, information indicating a number of pixels per line in the main scanning direction of the image data of the color component;

(b) calculating, by the calculation circuit connected to the plurality of registers, and configured to calculate an assertion period and for each color component amongst the plurality of color components, an assertion period for the color component, based on the number of pixels per line stored in the register corresponding to the color component, and determining the longest assertion period having a maximum value among the assertion periods calculated for the plurality of color components, respectively, the assertion period indicating a time required for transferring one line of the image data of the corresponding color component from the first control circuit to the second control circuit;

(c) adding, by each addition circuit amongst the plurality of addition circuits provided for the plurality of color components, respectively, and connected to respective ones of the plurality of registers and to the calculation circuit, to each line of the image data of the corresponding color component amongst the plurality of color components, an amount of dummy data that is equal to a difference between (i) an amount of one line of the image data of the corresponding color component, determined based on the number of pixels per line stored in the corresponding register, and (ii) an amount of image data that is transferred during the longest assertion period determined in (b);

(d) generating, by the transfer control circuit connected to the calculation circuit and the plurality of addition circuits, an image data valid signal that is asserted for the longest assertion period determined in (b), and transmitting the image data valid signal to the second control circuit; and (e) transferring, by the first control circuit, for each color component amongst the plurality of color components, image data of the color component, in which the dummy data is added in (c), to the second control circuit when the image data valid signal is asserted.

2. The image processing device of claim 1, wherein for each color component amongst the plurality of color components, the first control circuit transfers the image data of the color component to the second control circuit on the line basis in the main scanning direction using a bus width that is previously determined for the color component, the calculation circuit calculates the assertion period for the color component based on the number of pixels in the main scanning direction and the bus width, and the dummy data has an amount that is equal to the difference between an amount of one line of the image data of the color component and an amount of image data that is transferred during the longest assertion period using the bus width.

3. The image processing device of claim 2, wherein the register provided for the corresponding color component amongst the plurality of color components further stores an amount of information per pixel of the image data of the corresponding color component, and the calculation circuit calculates the assertion period in (b) based on the amount of information per pixel and the number of pixels in the main scanning direction.

4. The image processing device of claim 1, wherein the second control circuit transmits to the first control circuit:

one horizontal synchronization signal indicating a range of a main scanning direction of the object on which the image data is to be output; and a plurality of vertical synchronization signals generated for the plurality of color components, respectively, each vertical synchronization signal indicating a range of a sub-scanning direction of the object on which the image data of the corresponding color component amongst the plurality of color components is to be output.

5. The image processing device of claim 4, wherein the register provided for the corresponding color component amongst the plurality of color components includes:

a first storage area for a present page of the image data of the corresponding color component; and a second storage area for a next page of the image data of the corresponding color component, and wherein the register updates contents of the first storage area according to contents of the second storage area when the vertical synchronization signal for the corresponding color component is asserted.

6. The image processing device of claim 4, wherein the first control circuit determines whether each vertical synchronization signal for one of the plurality of color components is asserted when the horizontal synchronization signal is asserted.

7. The image processing device of claim 4, wherein the calculation circuit calculates the assertion period for one or more of the plurality of color components for which the vertical synchronization signal is asserted, except for the color component for which the vertical synchronization signal is negated.

8. The image processing device of claim 1, wherein the plurality of color components includes black, magenta, cyan, and yellow.

9. An image forming apparatus, comprising:
the image processing device of claim 1; and
an image forming device to output, for each color component amongst the plurality of color components, the image data of the color component which is transferred from the first control circuit to the second control circuit, to a target object on a line basis under control of the second control circuit.

10. An image processing device comprising: first control means including a plurality of storing means, calculation means, a plurality of addition means and transfer controlling means, to transfer, for each color component amongst a plurality of color components, image data of the color component on a line basis, for a plurality of lines, in a main scanning direction, the image data transferred on the line basis for the plurality of lines collectively constituting one or more pages; and second control means for processing the image data transferred, for said each color component amongst the plurality of color components, from the first control means to output the processed image data on a line basis as data to be output on an object, the first control means and the second control means operating in combination to perform a process comprising:

(a) storing, for each color component amongst the plurality of color components, in a storing means provided for the color component, from amongst the plurality of storing means, information indicating a number of pixels per line in the main scanning direction of the image data of the color component;

(b) calculating, by the calculation means and for each color component amongst the plurality of color components, an assertion period for the color component, based on the number of pixels per line in the main scanning direction stored by the storing means corresponding to the color component, and determining the longest assertion period having a maximum value among the assertion periods calculated for the plurality of color components, respectively, the assertion period indicating a time required for transferring one line of the image data of the corresponding color component from the first control means to the second control means (c) adding, by the addition means amongst the plurality of addition means, to each line of the image data of the corresponding color component amongst the plurality of color components, an amount of dummy data that is equal to a difference between (i) an amount of one line of the image data of the corresponding color component, determined based on the number of pixels per line stored in the corresponding one of the storing means, and (ii) an amount of image data that is transferred during the longest assertion period;

(d) generating, by the transfer controlling means, an image data valid signal that is asserted for the longest assertion period, and transmitting the image data valid signal to the second control means; and (e) transferring, by the first control means, for each color component amongst the plurality of color components, image data of the color component, in which the dummy data is added, to the second control means when the image data valid signal is asserted.

11. The image processing device of claim 10, wherein for each color component amongst the plurality of color components, the first control means for transferring the image data of the color component to the second control means on the line basis in the main scanning direction using a bus width that is previously determined for the color component, the calculation means for calculating the assertion period for the color component, based on the number of pixels in the main scanning direction and the bus width, and the dummy data has an amount that is equal to the difference between an amount of one line of the image data of the color component and an amount of image data that is transferred during the longest assertion period using the bus width.

12. The image processing device of claim 10, wherein the second control means transmits to the first control means:

one horizontal synchronization signal indicating a range of a main scanning direction of the object on which the image data is to be output; and a plurality of vertical synchronization signals generated for the plurality of color components, respectively, each vertical synchronization signal indicating a range of a sub-scanning direction of the object on which the image data of the corresponding color component amongst the plurality of color components is to be output.

13. The image processing device of claim 12, wherein the storing means provided for the corresponding color component amongst the plurality of color components includes:

a first storage means for storing a present page of the image data of the corresponding color component; and a second storage means for storing a next page of the image data of the corresponding color component, and wherein the storing means updates contents of the first storage means according to contents of the second storage means when the vertical synchronization signal for the corresponding color component is asserted.

14. The image processing device of claim 12, wherein the first control means determines whether each vertical synchronization signal for one of the plurality of color components is asserted when the horizontal synchronization signal is asserted.

15. The image processing device of claim 12, wherein the calculation means calculates the assertion period for one or more of the plurality of color components for which the vertical synchronization signal is asserted, except for the color component for which the vertical synchronization signal is negated.

16. The image processing device of claim 10, wherein the plurality of color components includes black, magenta, cyan, and yellow.

17. The image processing device of claim 11, wherein the storing means provided for the corresponding color component amongst the plurality of color components further stores an amount of information per pixel of the image data of the corresponding color component, and the calculation means calculates the assertion period in (b) based on the amount of information per pixel and the number of pixels in the main scanning direction.

18. An image forming apparatus, comprising:

the image processing device of claim 10; and output means for outputting, for each color component amongst the plurality of color components, the image data of the color component which is transferred from the first control means to the second control means, to the object on a line basis under control of the second control means.

19. An image processing method performed by a image processing device including a first control circuit to transfer, for each color component amongst a plurality of color components, image data of the color component on a line basis in a main scanning direction, the image data transferred on the line basis for the plurality of lines collectively constituting one or more pages, and a second control circuit connected to the first control circuit, the method comprising:

(a) storing, for each color component amongst the plurality of color components, in a memory, information indicating a number of pixels per line in the main scanning direction of the image data of the color component;

(b) calculating, for each color component amongst the plurality of color components, an assertion period for the color component, based on the number of pixels per line in the main scanning direction, the assertion period indicating a time required for transferring one line of the image data of the corresponding color component from the first control circuit to the second control circuit, and determining the longest assertion period having a maximum value among the assertion periods calculated for the plurality of color components, respectively;

(c) adding to each line of the image data of the corresponding color component amongst the plurality of color components, an amount of dummy data that is equal to a difference between (i) an amount of one line of the image data of the corresponding color component, determined based on the number of pixels per line stored in the corresponding the storing means, and (ii) an amount of image data that is transferred during the longest assertion period;

(d) generating an image data valid signal that is asserted for the longest assertion period, and transmitting the image data valid signal from the first control circuit to the second control circuit; and (e) transferring, for each color component amongst the plurality of color components, in which the dummy data is added, from the first control circuit to the second control circuit when the image data valid signal is asserted.

20. The image processing method of claim 19, further comprising:

outputting the image data of each of the plurality of color components, which is transferred from the first control means to the second control means, to the object on a line basis to form an image on the object.

* * * * *